United States Patent

[11] 3,527,143

| [72] | Inventor | Kenneth Hayter<br>Hale, Lancashire, England |
|---|---|---|
| [21] | Appl. No. | 756,807 |
| [22] | Filed | Sept. 3, 1968 |
| [45] | Patented | Sept. 8, 1970 |
| [73] | Assignee | Automotive Products Company Limited<br>Leamington Spa, Warwickshire, England<br>a British company |

[54] CONTROL SYSTEMS
6 Claims, 3 Drawing Figs.

[52] U.S. Cl. .................................................. 91/411,
244/78
[51] Int. Cl. ............................................ F15b 13/06,
B64c 13/36
[50] Field of Search ................................... 244/76,
77M, 78; 91/411, 411A, 413

[56] References Cited
UNITED STATES PATENTS

| 2,826,896 | 3/1958 | Glaze et al. .................. | 91/411(A)UX |
| 3,027,120 | 3/1962 | Campbell et al. ............. | 19/411(A)UX |
| 3,138,002 | 6/1964 | Ernst et al. ................... | 244/77(M)UX |
| 3,272,062 | 9/1966 | Fuppo et al. .................. | 91/411(A)UX |
| 3,338,139 | 8/1967 | Wood ............................ | 91/411(A)UX |

*Primary Examiner*—Edgar W. Geoghegan
*Attorney*—Lawrence J. Winter

ABSTRACT: In a control system for aircraft flight controls having a fluid pressure motor supplied with fluid pressure from two separate sources having separate selector valves controlled by separate fluid pressure actuators controlled by an electrical system, the said actuators are coupled together through a spring box to enable either one to continue to operate if the other one fails.

INVENTOR
Kenneth Hayter
BY
ATTORNEY

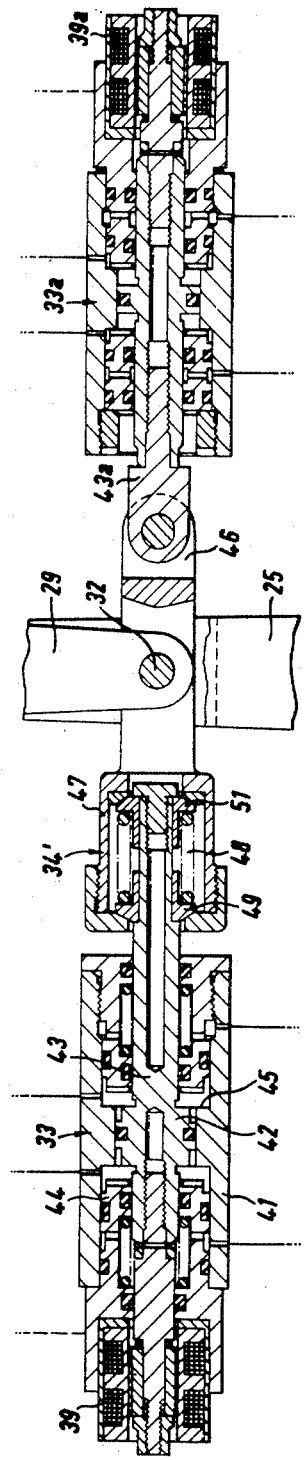
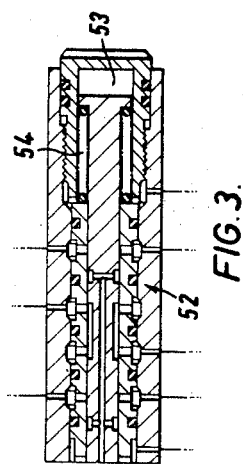

2

CONTROL SYSTEMS

SPECIFICATION

The present invention relates to control systems for aircraft flight controls in which the movements of a manual control member is, or signals from an automatic pilot or auto-stabiliser are, employed to control the supply of fluid pressure to a fluid pressure motor device actuating the controlled element, two completely separate fluid pressure systems each including a selector valve being provided to supply fluid under pressure to the motor device.

It is the object of the present invention to provide a control system as set out in the last preceding paragraph, in which the supply of fluid pressure to the motor device by each of the said systems, whether under manual control or under automatic control, is capable of being effected regardless of failure of the other system.

According to the present invention, in a control system for aircraft flight controls including a fluid pressure motor device for effecting a desired control operation, said fluid pressure operated motor device having fluid pressure chambers arranged to receive fluid pressure separately from two fluid pressure sources, the supply of fluid pressure to the actuating member from each of said sources being controlled by first and second selector valves connected for simultaneous operation by a lever mechanism, and means for mechanically operating said lever mechanisms to operate said control valves, two separate fluid pressure control actuators are arranged to operate said lever mechanism in response to electrical input signals, said control actuators being arranged in separate fluid pressure circuits controlled by separate electrical circuits, one of the said control actuators being connected to the lever mechanism through a resilient coupling means to enable either one of the control actuators to operate independently of the other.

Preferably, the control actuators are double-acting fluid pressure motor devices.

Valve means may be provided to connect together the two ends of the said other control actuator in the event of loss of fluid pressure in its associated fluid pressure system to allow free movement thereof and operation of the linkage by said one control actuator.

The said one control actuator is preferably provided with spring means acting to urge the movable member thereof to a predetermined position in the event of failure of the actuating fluid pressure therefor.

One embodiment of the invention will now be described with reference to the accompanying drawings, in which:

FIG. 2 is a sectional elevation showing the control actuators and the resilient connection; and FIG. 3 is a sectional elevation of one of the valves in the system.

Figure 1:
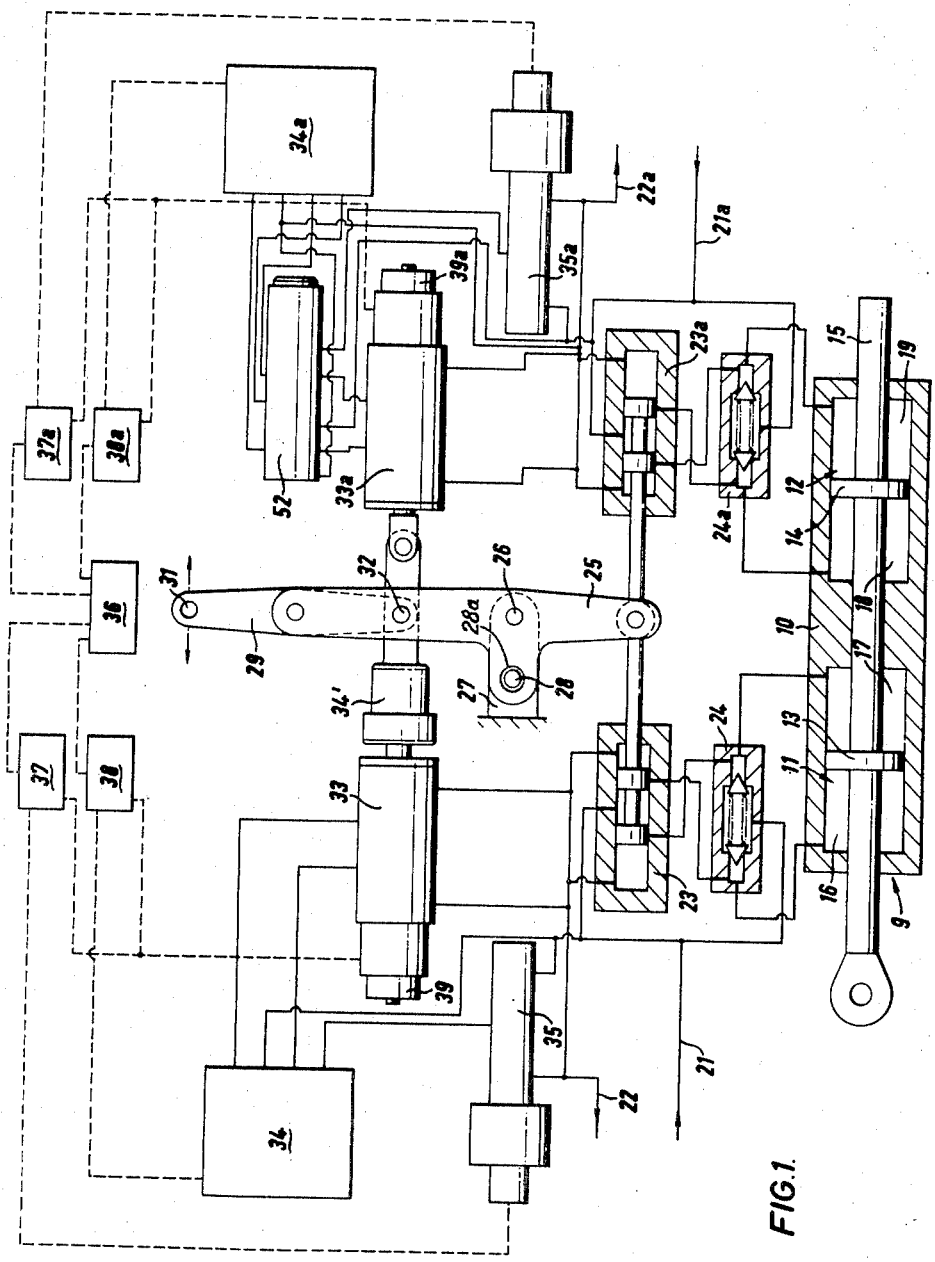
FIG. 1 is a diagram of the control system showing the fluid pressure connections in full lines and the electrical connections in dotted lines.

Referring to FIG. 1 of the drawings, the fluid pressure motor device is shown at 9, and has a cylinder member 10 divided into two spaces 11 and 12 arranged in tandem in which are slidable respectively pistons 13 and 14 mounted on a common piston rod 15, the said piston rod being anchored to a fixed structure and the cylinder member being movable thereon. The pistons 13 and 14 divide the spaces 11 and 12 respectively into chambers 16 and 17 and into chambers 18 and 19.

The connection of the chambers 16 and 17 selectively to a conduit 21 leading to a pressure source (not shown) and to a conduit 22 leading to a reservoir or drain (not shown) is controlled by a selector valve 23, and the connection of the chambers 18 and 19 selectively to corresponding conduits 21a and 22a, the conduit 21a leading to a separate pressure source, is controlled by a corresponding selector valve 23a, the motor ports of the respective selector valves being connected to the appropriate chambers in the motor device through additional valves 24, 24a arranged to connect either one of the chambers 16 or 17 or of the chambers 18 or 19 directly to the conduit 21 or 21a from which those chambers receive pressure fluid at times when the motor ports of the associated selector valve are closed. Thus, if the fluid pressure supply to the motor device through one of the selector valves fails whilst the motor device is under a high external load, thus creating an excessive pressure in one chamber of the motor device supplied through the other selector valve, the excessive pressure can be relieved through the valve 24 or 24a until it falls to a value substantially equal to the supply pressure.

The plungers of the two selector valves 23, 23a are both pivotally connected to one end of a differential lever 25, pivoted at its centre, at 26, on a bracket 27, and having its angular movement limited by stop means comprising a pin 28 on the bracket 27 projecting into a hole 28a in the lever 25, the hole being of larger diameter than the pin. The mounting of the differential lever 25 is preferably carried by the cylinder member 10 of the motor device 9, as are also the valves 23, 23a, 24, 24a. To the other end of the differential lever 25 is pivotally mounted the centre point of a reduction lever 29, one end 31 of which is coupled by mechanical linkage to a pilot's control. The other end 32 of the reduction lever 29 is pivotally coupled to two fluid pressure control actuators 33 and 33a, which will be more fully described hereinafter, the control actuator 33 being connected to the lever 29 through a resilient coupling 34', also more fully described hereinafter. The bodies of the control actuators 33 and 33a are also carried by the cylinder 10 of the motor device 9.

It will be apparent that movement of the reduction lever 29 by the pilot's control will cause it to pivot about its connection to the control actuators 33, 33a and move the differential lever to actuate the selector valves 23 and 23a, causing fluid under pressure to be admitted to two chambers of the motor device to move the cylinder of the latter in one or the other direction, the movement of the cylinder producing a follow-up action tending to restore the selector valves to their neutral positions.

Similarly, the control actuators will cause the reduction lever 29 to pivot about its connection to the mechanical linkage and actuate the selector valves 23 and 23a in a similar manner.

The control actuators 33 and 33a are double-acting actuators to which fluid under pressure is supplied, when operation is required, through respective selector valves 34, 34a to which fluid is in turn admitted by pilot valves 35 and 35a, the selector valves and pilot valves being of any suitable form. The selector valves 34, 34a may be valves of the Atchley model 408 type using the Askania jet pipe principle, but other types of valves may be used.

The selector valves 34, 34a, and the pilot valves 35, 35a are operated by electro-magnetic means, electrical signals from an auto-pilot or auto-stabiliser, fed through an input unit 36, being passed through monitors 37, 37a to the pilot valve controls and through demodulator-amplifier units 38, 38a to the selector valve controls. Each control actuator embodies a linear differential transformer unit 39 or 39a providing feedback signals to the monitors 37, 37a and the demodulator-amplifier units 38, 38a. Each monitor 37 or 37a accepts the same input signal as the associated selector valve 34 or 34a. The monitor circuit is an electronic equivalent of the fluid pressure system comprising the auto-actuator and its selector valve, (i.e. its transfer function is identical to that of the said fluid pressure system), and it converts the input signal to a reference signal equivalent to that of the output of the fluid pressure system. Thus, since the feed-back signal from the linear differential transformer in each control actuator is representative of the output of the fluid pressure system, comparison of it in the monitor with the reference signal shows whether the response of the control actuator to the input signal is correct. If the reference signal and the feed-back signal differ by more than a predetermined amount, the electrical connection to the valves associated with the control actuator is broken, so that the control signals are applied only to the valves of the other control actuator. Under these conditions, the pilot valve 35 or 35a connects the selector valve 34 or 34a to drain and no pressure can be applied to the control actuator.

Referring now to FIG. 2 of the drawings, it will be seen that the control actuator 33 comprises a body 41 in which is slidable a plunger 42 carried by a stem 43. One end of the stem 43 extends into the resilient coupling 34', which will be described below, and the other end carries the moving component of the linear differential transformer 39. The fluid spaces on opposite sides of the plunger 42 are bounded by spring-loaded annular plungers 44 which, in the absence of fluid pressure in the said spaces, move inwardly to engage shoulders 45 in the body and hold the plunger 42 against movement. The other control actuator 33a is generally similar to the actuator 33, except that the spring-loaded annular plungers are omitted. The stem 43a of the control actuator 33a is pivotally connected to one end of a link 46 which is in turn pivoted at 32 to the reduction lever 29. The other end of the link 46 carries the housing 47 of the resilient coupling 34', which is in the form of a spring box, a spring 48 therein acting between abutment members 49, 51 co-operating with abutment surfaces in the housing 47 and on the stem 43 to hold those two components normally in fixed relative positions, but to allow relative movement between them in either direction under forces sufficient to overcome the load of the spring 48.

The control actuator 33a is connected to its associated selector valve 34a through a centralising valve 52, shown diagrammatically in FIG. 1 and in more detail in FIG. 3, the centralising valve acting, if fluid pressure is lost from the fluid pressure circuit feeding that control actuator, to connect together the chambers on the two sides of the actuator piston and so allow the piston to move freely in the actuator body. As shown in FIG. 3, the centralising valve comprises a plunger which, so long as fluid pressure in the system acts on one end thereof at 53, is held in a position to connect conduits leading from the selector valve 34a to conduits leading to the control actuator but, when the pressure fails, is moved by a spring 54 to connect both the conduits leading from the selector valve and the conduits leading to the control actuator to drain.

It will be seen from the preceding description that each of the pairs of chambers 16, 17 and 18, 19 in the motor device 9, with the selector valve 24 or 24a controlling the supply of fluid pressure to those chambers, forms a system quite separate from the other pair of chambers and selector valve, with a separate source of pressure supply. Moreover each of the control actuators 33 and 33a and its associated valves is in a fluid pressure circuit quite separate from that including the other of said actuators, and has a separate electrical control system. The supply of fluid pressure to each pair of chambers of the motor device 9, and to the control actuator on the same side of the levers 25, 29 as the selector valve 23 or 23a for those chambers, is derived from a common source.

So long as the whole system is fully operative, movement of the manual linkage or a signal derived from the automatic pilot or auto-stabiliser actuates both selector valves 23 and 23a and fluid pressure operates in both halves of the motor device to provide the control operation. If the fluid pressure from the source supplying the motor chambers 16 and 17 and the control actuator 33 fails, that actuator is locked in a mean position by the spring-loaded plungers 44, but the resilient coupling 34 allows the levers to be moved by the other control actuator 33a to control the fluid pressure supply through the selector valve 23a to the motor chambers 18 and 19, thus maintaining effective control.

If, on the other hand, the fluid pressure from the source supplying the motor chambers 18 and 19 and the control actuator 33a fails, that actuator is relieved of any restraint by the fluid pressure, and the control actuator 33 can move the levers to control the supply of fluid pressure through the selector valve 23 to the motor chambers 16 and 17, again maintaining effective control.

If an electrical unit in the circuit controlling one of the control actuators 33 or 33a fails, that actuator becomes inoperative due to closing of its associated pilot valve 35 or 35a, but the associated selector valve 23 or 23a remains operative by the levers, and the remaining control actuator controls the supply of fluid pressure to both halves of the motor device.

If both control actuators become inoperative for any reason, provided that fluid pressure is still available for supply through one of the selector valves 23, 23a to the motor device, the control surface can be moved by the mechanical linkage, the holding of the piston of the control actuator 33 in a central position by the spring-loaded annular plungers 44 providing a fixed fulcrum for the reduction lever 29 to enable it to operate the selector valves 23, 23a.

I claim:

1. A control system for aircraft flight controls including a fluid pressure motor device for effecting a desired control operation, said fluid pressure operated motor device having fluid pressure chambers arranged to receive fluid pressure separately from two fluid pressure sources, the supply of fluid pressure to the actuating member from each of said sources being controlled by first and second selector valves connected for simultaneous operation by a lever mechanism, and means for mechanically operating said lever mechanism to operate said control valves, wherein two separate fluid pressure control actuators are arranged to operate said lever mechanism in response to electrical input signals, said control actuators being arranged in separate fluid pressure circuits controlled by separate electrical circuits, one of the said control actuators being connected to the lever mechanism through a resilient coupling means to enable the lever mechanism to be operated by the other control actuator if the said one control actuator fails and is immovable.

2. A control system according to claim 1, wherein said control actuators are double-acting fluid pressure motor devices.

3. A control system according to claim 2, wherein valve means are provided to connect together the two ends of the said other control actuator in the event of loss of fluid pressure in its associated fluid pressure system to allow free movement thereof and operation of the linkage by said one control actuator.

4. A control system according to claim 2 wherein said one control actuator is provided with spring means acting to urge the movable member thereof to a predetermined position in the event of failure of the the actuating fluid pressure therefor.

5. A control system according to claim 1, wherein the lever mechanism comprises a differential lever having a pivot intermediate its ends and connected at one end to the said selector valves, a reduction lever pivotally mounted on the other end of said differential lever being connected at one end to a manual control linkage and at the other end to the said control actuators.

6. A control system according to claim 1, wherein the resilient coupling means comprises a spring box including a casing, a stem extending into said casing, and a spring in said casing acting between two abutment members each co-operating with abutment surfaces both on the stem and in the casing to hold those two components normally in fixed relative positions.